United States Patent [19]

Cenker et al.

[11] 4,166,164

[45] Aug. 28, 1979

[54] PROCESS FOR THE PREPARATION OF CARBODIIMIDE-ISOCYANURATE FOAMS

[75] Inventors: Moses Cenker, Trenton; Thirumurti Narayan, Riverview, both of Mich.; Harald P. Wulff, Baton Rouge, La.

[73] Assignee: BASF Wyandotte Corporation, Wyandotte, Mich.

[21] Appl. No.: 857,230

[22] Filed: Dec. 5, 1977

[51] Int. Cl.$^2$ ............ C08G 18/14; C08G 18/22; C08G 18/18; C08G 18/20
[52] U.S. Cl. .................. 521/129; 521/117; 521/124; 521/125; 521/126; 521/127; 521/901; 521/902; 521/903
[58] Field of Search .......... 260/2.5 AB, 2.5 AW, 260/2.5 BF; 521/125, 901, 902

[56] References Cited

U.S. PATENT DOCUMENTS

| | | | |
|---|---|---|---|
| 3,252,942 | 5/1966 | France et al. | 260/77.5 |
| 3,622,577 | 11/1971 | Pedersen | 260/248 NS |
| 3,657,161 | 4/1972 | Bernard et al. | 260/2.5 AW |
| 3,717,596 | 2/1973 | Kan et al. | 260/2.5 BF |
| 3,806,475 | 4/1974 | Narayan | 260/2.5 BF |
| 3,931,065 | 1/1976 | Ashida | 260/2.5 AW |
| 3,940,517 | 2/1976 | DeLeon | 427/373 |
| 3,969,288 | 7/1976 | Cenker | 260/2.5 AW |
| 4,051,082 | 9/1977 | Cenker | 260/2.5 BF |
| 4,054,546 | 10/1977 | Narayan | 260/2.5 AW |

FOREIGN PATENT DOCUMENTS 1390231  4/1975  United Kingdom .

*Primary Examiner*—H. S. Cockeram
*Attorney, Agent, or Firm*—Joseph D. Michaels; Robert E. Dunn; Bernhard R. Swick

[57] ABSTRACT

Rigid foams characterized by carbodiimide and isocyanurate linkages are prepared by catalytically condensing an organic polyisocyanate in the presence of (a) a carbodiimide-promoting compound and (b) certain $C_1$–$C_8$ alkali metal carboxylates as trimerization catalysts.

8 Claims, No Drawings

PROCESS FOR THE PREPARATION OF CARBODIIMIDE-ISOCYANURATE FOAMS

BACKGROUND OF THE INVENTION

1. Field of the Invention

The present invention relates to a process for the preparation of foams characterized by carbodiimide and isocyanurate linkages. More particularly, the invention relates to the use of a co-catalyst system comprising a $C_1$–$C_8$ alkali metal carboxylate and a carbodiimide-promoting compound in the preparation of foams characterized by carbodiimide and isocyanurate linkages.

2. Prior Art

The preparation of rigid foams characterized by carbodiimide and isocyanurate linkages is well known in the art as evidenced by inter alia U.S. Pat. Nos. 3,645,923; 3,657,161; 3,717,596; 3,723,366; and 3,746,709. Generally these foams are prepared by catalytically condensing an organic polyisocyanate in the presence of a compound which promotes the carbodiimide reaction and a compound which promotes the trimerization reaction. Representative trimerization compounds known in the art include: (a) organic strong bases, (b) tertiary amine cocatalyst combinations, (c) Friedel-Crafts catalysts, (d) basic salts of carboxylic acids, (e) alkali metal oxides, alkali metal alcoholates, alkali metal phenolates, alkali metal hydroxides and alkali metal carbonates, (f) onium compounds from nitrogen, phosphorus, arsenic, antimony, sulfur and selenium and (g) monosubstituted monocarbamic esters.

SUMMARY OF THE INVENTION

The present invention relates to novel catalyst systems for the preparation of foams characterized by carbodiimide and isocyanurate linkages. The catalyst systems employed in the present invention comprise a carbodiimide-promoting compound and certain $C_1$–$C_8$ alkali metal carboxylates. The catalyst systems of the subject invention allow for the preparation of foams by initiation at ambient temperatures without external heat. The reaction occurs very rapidly and provides fully cured foams in record times.

DESCRIPTION OF THE PREFERRED EMBODIMENTS

As mentioned above, the present invention relates to the preparation of foams characterized by carbodiimide and isocyanurate linkages by catalytically condensing an organic polyisocyanate in the presence of a compound which promotes the carbodiimide reaction and a $C_1$–$C_8$ alkali metal carboxylate which promotes the trimerization reaction.

Representative $C_1$–$C_8$ alkali metal carboxylates of use in the subject invention include the sodium and potassium salts of formic, acetic, propionic, butanoic, 2-methylpropionic, pentanoic, 3-methylbutanoic, 2,2-dimethylpropionic, hexanoic, 2,2-dimethylbutanoic, 3,3-dimethylbutanoic, 2-ethylbutanoic, 2- or 4-methylpentanoic, heptanoic, 2,2-dimethylpentanoic, octanoic, 2-ethylhexanoic, 2-propylpentanoic, 2,2-dimethylhexanoic, cyclobutanecarboxylic, cyclopentanecarboxylic, cyclohexanecarboxylic, cyclohexylacetic, malonic, succinic, glutaric, adipic, pimelic, and suberic. Generally from 0.1 to 10 percent by weight of $C_1$–$C_8$ alkali metal carboxylate based on the weight of the organic polyisocyanate will be employed in the process of the subject invention.

In addition to a $C_1$–$C_8$ alkali metal carboxylate, a carbodiimide-promoting compound is employed in the process of the subject invention. Representative compounds which promote the carbodiimide reaction include phosphorus compounds such as phospholene oxide, aliphatic alcohols such as methyl alcohol and furfuryl alcohol; amino alcohols having a molecular weight of from 89 to 304 such as N,N-dialkylaminoalkanols, triethanolamine, N-2-hydroxyethylmorpholine and N,N,N',N'-tetrakis(2-hydroxypropyl)ethylene diamine and s-triazine compounds such as 2,4,6-tris(diethanolamino)-s-triazine, 2,4,6-tris(N-methylethanolamino)-s-triazine, and unsymmetrically substituted triazines of the formula:

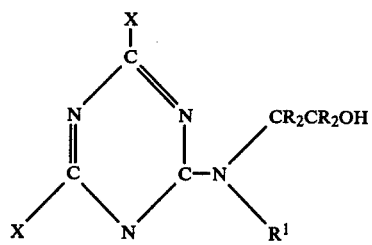

wherein R is hydrogen or lower alkyl of from 1 to 10 carbon atoms, $R^1$ is $CR_2CR_2OH$ or lower alkyl of from 1 to 12 carbon atoms, X is $NR_2$, alkoxy of from 1 to 12 carbon atoms, phenoxy, alkyl of from 1 to 12 carbon atoms, phenyl, hydroxyl, halogen, aziridyl, pyrrolidyl, piperidyl, or N-alkylpiperazyl. Since the triazines are unsymmetrically substituted, it is apparent that each X cannot concurrently be

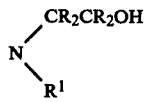

wherein each R and $R^1$ is the same. Generally from about 0.1% to 10% by weight of carbodiimide-promoting compound based on the weight of organic polyisocyanate will be employed in the subject invention.

The organic polyisocyanate used in the preparation of the foams in the process of the subject invention corresponds to the formula:

wherein R" is a polyvalent organic radical which is either aliphatic, aralkyl, alkaryl, aromatic or mixtures thereof, and z is an integer which corresponds to the valence of R" and is at least two. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanate; the aromatic tetraisocyanates such as 4,4'-dimethyldiphenylmethane-2,2',5,5'-tetraisocyanate, and the like; arylalkyl polyisocyanates, such as xylylene diisocyanate; aliphatic polyisocyanates, such as hexamethylene-1,6-diisocyanate, lysine diisocyanate methyl ester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenyl-2,4-diisocyanate, 4,4'-biphenylene diisocyanate, 3,3'-dimethyl-4,4'-biphenyl diisocyanate, and 3,3'-dimethyldiphenylmethane-4,4'-diisocyanate.

These polyisocyanates are prepared by conventional methods known in the art such as the phosgenation of the corresponding organic amine.

Still another class of organic polyisocyanates contemplated for use herein are the so-called "quasi-prepolymers". These quasi-prepolymers are prepared by reacting an excess of organic polyisocyanate or mixtures thereof with a minor amount of an active hydrogen-containing compound as determined by the well-known Zerewitinoff test, as described by Kohler in *Journal Of The American Chemical Society*, 49, 3181 (1927). These compounds and their methods of preparation are well known in the art. The use of any one specific active hydrogen compound is not critical hereto, rather any such compound can be employed herein.

Suitable active hydrogen-containing groups as determined by the Zerewitinoff method which are reactive with an isocyanate group include —OH, —NH—, —COOH, and —SH. Examples of suitable types of organic componds containing at least two active hydrogen-containing groups which are reactive with an isocyanate group are hydroxyl-terminated polyesters, polyalkylene ether polyols, hydroxyl-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic aliphatic and heterocyclic diamines, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, 1,3-propylene glycol, 1,2-propylene glycol, 1,4-butanediol, 1,3-butanediol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine.

Any suitable polyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxidetetrahydrofuran mixtures; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia Of Chemical Technology*, Vol. 7, pp. 257–262, published by Interscience Publishers, Inc. (1951) or in U.S. Pat. No. 1,922,459. Alkylene oxide adducts of Mannich condensation products are also useful in the invention.

Alkylene oxide adducts of acids of phosphorus which may be used include those neutral adducts prepared from the alkylene oxides diclosed above for use in the preparation of polyalkylene polyether polyols. Acids of phosphorus which may be used are acids having a $P_2O_5$ equivalency of from about 72% to about 95%. The phosphoric acids are preferred.

Any suitable hydroxy-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkenethiols such as 2-butene-1,4-dithiol, and alkynethiols such as 3-hexyne-1,6-dithiol.

Any suitable polyamine may be used including aromatic polyamines such as methylene dianiline, polyarylpolyalkylene polyamine (crude methylene dianiline), p-aminoaniline, 1,5-diaminonaphthalene, and 2,4-diaminotoluene; aliphatic polyamines such as ethylenediamine, 1,3-butylenediamine, as well as substituted secondary derivatives thereof.

In addition to the above hydroxyl-containing compounds, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

The reactive polyol medium generally has a molecular weight of at least about 500 and a hydroxyl number ranging from about 30 to about 600. The graft polyol has a molecular weight of at least about 1500 and a viscosity of less than 40,000 cps. at 10% polymer concentration.

A more comprehensive discussion of the graft polyols and their method of preparation can be found in U.S. Pat. Nos. 3,383,351; 3,304,273; 3,652,639, and 3,823,201, the disclosures of which are hereby incorporated by reference.

Also, polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185; 3,639,541; and 3,639,542. As is clear from the above, the particular polyol ingredient employed in the preparation of the quasi-prepolymer is not a critical aspect of the present invention. Any compound containing at least two reactive hydrogen atoms may be so used. Particularly preferred componds are those having an equivalent weight between 100 and 1500.

If desired, the process of the subject invention can be carried out by condensing an organic polyisocyanate in the presence of a polyol. Any of the organic compounds containing at least two active hydrogen-containing groups reactive with an isocyanate group described above in connection with the preparation of the "quasi-prepolymers" may be employed in the subject invention. Generally, the amount of polyol employed will be from 5% to 70% by weight, preferably from 5% to 20% by weight, based on the weight of the organic polyisocyanate. If a polyol is employed in the process of the subject invention it is preferred to also employ a urethane catalyst.

Urethane catalysts which may be employed in the present invention are well known in the art and include the metal or organometallic salts of carboxylic acid and tertiary amines. Representative of such compounds are: dibutyltin dilaurate, dibutyltin diacetate, stannous octoate, lead octoate, cobalt naphthenate, and other metal or organometallic salts of carboxylic acids in which the metal is bismuth, titanium, iron, antimony, uranium, cadmium, aluminum, mercury, zinc, or nickel as well as other organometallic compounds such as are diclosed in U.S. Pat. No. 2,846,408. Tertiary amines such as triethylenediamine, triethylamine, diethylcyclohexylamine, N-ethylmorpholine and diethylethanolamine may also be employed as well as mixtures of any of the above. The preferred urethane-promoting catalyst is dibutyltin diacetate. Generally, the amount of urethane-promoting catalyst employed will be from 0.01% to 10% by weight based on the weight of organic polyisocyanate.

The foams of the present invention are prepared by mixing together the organic polyisocyanate, optionally a polyol, and the catalysts at ambient temperatures. Under such conditions almost immediately an exotherm is developed within the reaction system, carbon dioxide is generated and foam formation begins. Alternatively, the foams may be prepared by adding the polyols and the catalysts to the mixture of polyisocyanate and an auxiliary blowing agent, preferably a halohydrocarbon.

The present invention also contemplates the incorporation of additional ingredients in the foam formulation to tailor the properties thereof. Thus, plasticizers, surfactants, such as the silicone surfactants, e.g. alkylpolysiloxanes, may be employed in the invention. Further additional ingredients include auxiliary or supplemental blowing agents, such as water or halohydrocarbons. Also, inorganic fillers, pigments, and the like can be used.

In any event, the foams prepared in accordance herewith are rigid cellular products having a density of from about one pound to forty pounds per cubic foot which exhibit excellent strength and flame properties, such as fire resistance, low smoke evolution, and excellent weight retention.

Following are specific, non-limiting examples which are provided to illustrate the enumerated principles described herein. All parts are by weight unless otherwise indicated. In the examples which follow, the following abbreviations are employed:

TDI—a mixture of 80/20 by weight 2,4-,2,6-tolylene diisocyanate

CMDI—polymethylene polyphenyl polyisocyanate

MDI—methylene diphenyldiisocyanate

TDH—1,3,5-tris(N,N-dimethylaminopropyl)-s-hexahydrotriazine

DMAE—N,N-dimethylaminoethanol

DMT—2,4-bis(diethylamino)-6-N-methylethanolamino-s-triazine

MA—methanol

FA—furfuryl alcohol

SS—polyalkylsiloxane-polyoxyalkylene copolymer, a foam stabilizer

PA—potassium acetate

NaA—sodium acetate

PEH—potassium 2-ethylhexanoate

PF—potassium formate

PP—potassium propionate

F-11B—trichlorofloromethane

Ph.O.—3-methyl-1-phenyl-1-phospha-3-cyclopentene-1-oxide

Polyol A—a polyol prepared by the reaction of ethylene oxide with trimethylolpropane, said polyol having an equivalent weight of 250

Polyol B—a polyol prepared by the reaction of propylene oxide with trimethyolpropane, said polyol having an equivalent weight of 100

Polyol C—a polyol prepared by the reaction of propylene oxide with pentaerythritol, said polyol having an equivalent weight of 100

Polyol D—an ester-containing polyol prepared by the reaction of propylene oxide with the product of the reaction of one mole of tetrabromophthalic anhydride with one mole of the propylene oxide adduct of pentaerythritol, said polyol having an equivalent weight of 235.

EXAMPLES I–XVI

A series of foams was prepared by mixing in a vessel at high speed, a stream of polyisocyanate and optionally a blowing agent, and a stream containing catalysts and a surfactant. Thereafter the resulting mixture was cast in a mold and the foams were allowed to free rise. The ingredients employed, amounts thereof, and reactivity profiles of the formulations are presented in Table I, below. Infrared spectrascopic analyses of the foams indicate the presence of carbodiimide and isocyanurate linkages.

Table I

| Example | I | II | III | IV | V | VI | VII | VIII |
|---|---|---|---|---|---|---|---|---|
| Ingredients, parts | | | | | | | | |
| TDI | 100 | 50 | 50 | 50 | 100 | 100 | 100 | — |
| CMDI | — | — | 50 | 50 | — | — | — | 100 |
| MDI | — | 50 | — | — | — | — | — | — |
| F-11B | — | — | — | — | — | — | — | 20 |
| S.S. | 1.0 | 1.0 | 1.0 | 1.0 | 1.0 | 1.0 | 1.0 | 1.0 |
| DMT | — | — | — | — | — | — | 2.0 | — |
| MA | 0.8 | 1.7 | 1.7 | — | — | — | — | 2.3 |
| FA | — | — | — | 1.7 | 1.7 | — | — | — |
| DMAE | — | — | — | — | — | 2.0 | — | — |
| Carboxylate | 0.7PA | 0.35PA | 0.35PA | 0.35PA | 0.35PA | 0.3PA | 0.3PA | 0.7PA |
| Reactivity, sec. | | | | | | | | |
| Cream Time | 23 | 4 | 10 | 14 | 4 | 7 | 8 | 27 |
| Gel Time | 27 | 15 | 20 | 20 | 10 | 15 | 15 | 60 |
| Tack free Time | 45 | 15 | 20 | 20 | 10 | 15 | 15 | 80 |
| Rise Time | 40 | 15 | 30 | 55 | 10 | 15 | 15 | 110 |
| Density, lb/ft$^3$ | 1.2 | 2.3 | — | — | 1.4 | 0.9 | 0.9 | 2.3 |

| Example | IX | X | XI | XII | XIII | XIV | XV | XVI |
|---|---|---|---|---|---|---|---|---|
| Ingredients, parts | | | | | | | | |
| TDI | 50 | 100 | 100 | 100 | 100 | 50 | 50 | 100 |
| CMDI | 50 | — | — | — | — | 50 | 50 | — |
| MDI | — | — | — | — | — | — | — | — |
| F-11B | — | — | — | — | — | — | — | — |
| S.S. | 1.0 | 1.0 | 1.0 | 1.0 | 1.0 | 1.0 | 1.0 | 1.0 |
| DMT | 2.0 | 2.0 | — | — | — | — | — | — |
| MA | — | — | 1.5 | 0.75 | 0.75 | — | — | — |
| FA | — | — | — | — | — | 3.0 | 0.64 | 3.0 |
| DMAE | — | — | — | — | — | — | — | — |
| Carboxylate | PEH(1.0) | PEH(1.0) | NaA(0.5) | PF(0.25) | PP(0.25) | PP(1.0) | PEH(0.33) | PF(1.0) |
| Reactivity, sec. | | | | | | | | |
| Cream Time | 12 | 11 | 180 | 6 | 8 | 10 | 28 | 4 |
| Gel Time | 17 | 16 | N.D. | 7 | 10 | 12 | 42 | 7 |
| Tack free Time | 25 | 20 | 240 | 12 | 15 | 15 | 45 | 9 |
| Rise Time | 35 | 33 | N.D. | 26 | 23 | 21 | 130 | 12 |
| Density, lb/ft$^3$ | 3.1 | 1.1 | N.D. | 1.0 | 1.6 | 6.7 | N.D. | 1.5 |

N.D. — not determined

EXAMPLES XVIII–XXV

A series of foams was prepared by mixing in a vessel at high speed a stream of polyisocyanate and a blowing agent and a stream containing a surfactant, catalysts and a polyol. The resulting mixture was cast in a mold and the foams were allowed to free rise. In all formulations, one part of silicone surfactant and twenty parts of trichlorofluoromethane blowing agent were employed. Other ingredients employed, amounts thereof and reactivity profiles of the formulations are presented in Table II, below. Infrared spectrascopic analyses of the foams indicate the presence of carbodiimide, isocyanurate and urethane linkages.

Table II

| Example | XVIII | XIX | XX | XXI | XXII | XXIII | XXIV | XXV |
|---|---|---|---|---|---|---|---|---|
| Ingredients, parts | | | | | | | | |
| CMDI | 100 | 100 | 100 | 100 | 100 | 100 | 50 | 70 |
| TDI | — | — | — | — | — | — | 50 | 30 |
| Polyol | B-20 | A-20 | B-20 | B-20 | A-20 | B-20 | A-20 | B-20 |
| DMT | 2.0 | — | — | — | — | — | — | 1.5 |
| MA | — | 1.3 | — | 1.5 | — | 1.5 | 2.25 | — |
| FA | — | — | 1.3 | — | 2.25 | — | — | — |
| Carboxylate | PEH(1.0) | PEH(0.7) | PEH(0.7) | PE(0.5) | PF(0.75) | PP(0.5) | PF(0.75) | PP(0.5) |
| Reactivity, sec. | | | | | | | | |
| Cream Time | 16 | 5 | 21 | 46 | 10 | 23 | 44 | 5 |
| Gel Time | 24 | 9 | 29 | 57 | 13 | 26 | 48 | 9 |
| Tack free Time | 29 | 13 | 45 | 60 | 15 | 28 | 60 | 15 |
| Rise Time | 48 | 26 | 55 | 81 | 27 | 42 | 88 | 30 |

EXAMPLES XXVI–XXXI

Foams were prepared employing the catalyst system of the subject invention and a typical catalyst system employed in the prior art. As the data in Table III indicate, the systems of the subject invention are superior in reactivity as compared to those of the prior art. In addition the systems of the present invention allow for the preparation of foams at ambient temperature conditions.

All formulations employed 100 parts of CMDI, one part of S.S., one part of ethylene glycol, 20 parts of F-11B and 20 parts of Polyol A. The catalysts employed and reactivities of the formulations are presented in Table III.

Table III

| Example | XXVI | XXVII | XXVIII | XXIX | XXX | XXXI |
|---|---|---|---|---|---|---|
| Catalysts, parts | | | | | | |
| TDH | 0.5 | — | 0.5 | — | 0.5 | — |
| PA | — | 0.5 | — | 0.5 | — | 0.5 |
| MA | 1.0 | 1.0 | — | — | — | — |

Table III-continued

| Example | XXVI | XXVII | XXVIII | XXIX | XXX | XXXI |
|---|---|---|---|---|---|---|
| DMT | — | — | 1.0 | 1.0 | — | — |
| Ph. O. | — | — | — | — | 1.0 | 1.0 |
| Reactivity, sec. | | | | | | |
| Cream Time | 13 | 7 | 17 | 7 | 17 | 7 |
| Gel Time | 60 | 12 | 80 | 15 | 80 | 13 |
| Tack free Time | 95 | 24 | 210 | 27 | 185 | 22 |
| Rise Time | 300 | 12 | 420 | 17 | 320 | 14 |

EXAMPLES XXXI–XXXVI

A series of foams was prepared in the manner described in the previous Examples. The ingredients, amounts thereof and properties of the resulting foams are presented in Table IV below.

Table IV

| Example | XXXI | XXXII | XXXIII | XXXIV | XXXV | XXXVI |
|---|---|---|---|---|---|---|
| Ingredients, parts | | | | | | |
| CMDI | 200 | 200 | 200 | 200 | 200 | 200 |
| F-11B | 40 | 40 | 48 | 50 | 48 | 50 |
| S.S. | 2 | 2 | 2 | 2 | 2 | 2 |
| Polyol | A40 | A40 | C30 | C30 | C20 | C20 |
|  |  |  | D10 | D10 | D20 | D20 |
| MA | 2.2 | — | 4.2 | — | 4.2 | — |
| FA | — | 7.2 | — | 7.2 | — | 7.2 |
| PA | 1.8 | 1.8 | 1.8 | 1.8 | 1.8 | 1.8 |
| Reactivity, sec. | | | | | | |
| Cream Time | 6 | 7 | 18 | 31 | 15 | 27 |
| Gel Time | 12 | 16 | 30 | 45 | 29 | 45 |
| Tack free Time | 42 | 16 | 35 | 60 | 35 | 52 |
| Rise Time | 23 | 28 | 57 | 75 | 60 | 76 |
| Physical Properties of Foam of Examples | | | | | | |
| Density, lb/ft.$^3$ | 2.0 | 2.2 | 1.8 | 1.8 | 1.9 | 1.8 |
| Comp. Str., psi, 10% defl. | 38 | 36 | 27 | 25 | 27 | 27 |
| Closed cell, corr, % | 101 | 103 | 100 | 100 | 100 | 100 |
| Friability, % wt. loss | 21 | 18 | 54 | 59 | 42 | 54 |
| Butler Chimney Test | | | | | | |
| wt. ret. % | 94 | 59 | N.D. | 89 | 88 | 88 |
| flame ht., in. | 6 | 6 | N.D. | 7 | 7 | 6 |
| time to SX, sec. | 10 | 10 | N.D. | 10 | 10 | 10 |
| NBS, smoke density, $D_m$ | 52 | 52 | 65 | 53 | 60 | 75 |

N.D. — Not Determined.

The embodiments of the invention in which an exclusive property or privilege is claimed are defined as follows:

1. A process for the preparation of foams characterized by carbodiimide and isocyanurate linkages comprising catalytically condensing an organic polyisocyanate in the presence of a catalytically sufficient amount of (a) a compound which promotes the carbodiimide reaction and (b) a $C_1$-$C_8$ alkali metal carboxylate.

2. The process of claim 1 wherein (b) is potassium acetate.

3. The process of claim 1 wherein (b) is potassium formate.

4. The process of claim 1 wherein (b) is potassium 2-ethylhexanoate.

5. The process of claim 1 wherein the organic polyisocyanate is selected from the group consisting of toluene diisocyanate, methylene diphenyl diisocyanate, polyphenyl polymethylene polyisocyanate and mixtures thereof.

6. The process of claim 1 wherein the carbodiimide-promoting catalyst is furfuryl alcohol or methanol.

7. The process of claim 1 wherein the carbodiimide-promoting catalyst is 2,4-bis(diethylamino)-6-N-methylethanolamino-s-triazine.

8. The process of claim 1 carried out in the presence of from 5% to 70% by weight based on the weight of the organic polyisocyanate of a polyol having an average functionality of 2 to 8 and an average hydroxyl equivalent of from about 100 to 1500.

* * * * *